(12) United States Patent
Moghadam

(10) Patent No.: US 9,986,176 B2
(45) Date of Patent: May 29, 2018

(54) 3D IMAGING METHOD AND SYSTEM

(71) Applicant: Commonwealth Scientific and Industrial Research Organisation, Campbell, ACT (AU)

(72) Inventor: Peyman Moghadam, Pullenvale (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 205 days.

(21) Appl. No.: 14/770,028

(22) PCT Filed: Feb. 25, 2014

(86) PCT No.: PCT/AU2014/000174
§ 371 (c)(1),
(2) Date: Aug. 24, 2015

(87) PCT Pub. No.: WO2014/127431
PCT Pub. Date: Aug. 28, 2014

(65) Prior Publication Data
US 2016/0006951 A1 Jan. 7, 2016

(30) Foreign Application Priority Data
Feb. 25, 2013 (AU) .............................. 2013900667

(51) Int. Cl.
*H04N 5/33* (2006.01)
*G03B 35/02* (2006.01)
(Continued)

(52) U.S. Cl.
CPC .............. *H04N 5/33* (2013.01); *G03B 35/02* (2013.01); *G06T 7/593* (2017.01); *G06T 7/90* (2017.01);
(Continued)

(58) Field of Classification Search
None
See application file for complete search history.

(56) References Cited

U.S. PATENT DOCUMENTS 7,072,504 B2  7/2006  Miyano et al.
8,254,647 B1*  8/2012  Nechyba ............ G06K 9/00248
                                                        382/118
(Continued)

OTHER PUBLICATIONS

European Search Report dated Aug. 10, 2016.
(Continued)

*Primary Examiner* — James M Anderson, II
(74) *Attorney, Agent, or Firm* — Harness, Dickey & Pierce, P.L.C.

(57) ABSTRACT

A system for generating a three-dimensional model of an object, the system including a portable hand-held imaging device including a housing, a plurality of sensors attached to the housing and at least one electronic processing device coupled to the plurality of sensors. The electronic processing device determines from the plurality of sensors, while the imaging device is in at least two different poses relative to the object, range data indicative of a range of the object and thermal infrared data indicative of a thermal infrared image of the object, generates a three-dimensional model based at least partially upon the range data from the at least two different poses and associates model data derived from the thermal infrared data from the at least two different poses with the three dimensional model to thereby provide a three dimensional thermal infrared model of the object.

36 Claims, 7 Drawing Sheets

(51) Int. Cl.
| | |
|---|---|
| *H04N 13/02* | (2006.01) |
| *G06T 11/00* | (2006.01) |
| *G06T 15/06* | (2011.01) |
| *G06T 17/00* | (2006.01) |
| *G06T 15/04* | (2011.01) |
| *G06T 7/593* | (2017.01) |
| *G06T 7/90* | (2017.01) |

(52) U.S. Cl.
CPC ............ *G06T 11/008* (2013.01); *G06T 15/04* (2013.01); *G06T 15/06* (2013.01); *G06T 17/00* (2013.01); *H04N 13/025* (2013.01); *G06T 2207/10012* (2013.01); *G06T 2207/10028* (2013.01); *G06T 2207/10048* (2013.01)

(56) References Cited

U.S. PATENT DOCUMENTS

| | | | | |
|---|---|---|---|---|
| 2006/0221072 | A1* | 10/2006 | Se | G01C 11/06 345/420 |
| 2010/0135550 | A1* | 6/2010 | Arnon | A61B 5/015 382/128 |
| 2011/0118608 | A1* | 5/2011 | Lindner | A61B 5/015 600/474 |

OTHER PUBLICATIONS

Karolj Skala et al: "4D thermal imaging system for medical applications", Periodicum biologorum, vol. 113 No. 4, Nov. 2011.

Yushuang Liu et al: "Interactive 3D model acquisition and registration", Computer Graphics and Applications, 2003. Proceedings. 11th Pacific Conference on Oct. 8-10, 2003, Piscataway, NJ, USA, IEEE, Oct. 8, 2003 (Oct. 8, 2003), pp. 115-122.

Extended European Search Report for European Patent Application No. 14754127.0 dated Nov. 21, 2016.

Daniel F. Huber et al. "Fully automatic registration of multiple 3D data sets", Image and Vision Computing, 2003.

Daniel F. Huber et al. "Fully automatic registration of multiple 3D data sets", The Robotics Institute, Carnegie Mellon University, 2001.

U Stilla et al, "Texture mapping of 3D building models with oblique direct geo-referenced airborne IR image sequences", 2009.

Yi-Ping Hung et al, "Reconstruction of complete 3D object model from multi-view range images", 1999.

H P A Lensch et al, "Automated texture registration and stitching for real world models", Computer Graphics and Applications, 2000 Proceedings, the Eight Pacific Conference on Hong Kong, China Oct. 3-5, 2000, Los Alamitos, CA ,USA IEEE Computer Society US, Oct. 3, 2000.

First Office Action for CN 201480022819.6, dated Apr. 1, 2017 SIPO (English translation provided).

Q. Zhang and R. Pless, "Extrinsic calibration of a camera and laser range finder (improves camera calibration)," in Proceedings of the IEEE/RSJ International Conference on Intelligent Robots and Systems, vol. 3, 2004, pp. 2301-2306.

R. Unnikrishnan and M. Hebert, "Fast extrinsic calibration of a laser rangefinder to a camera," Robotics Institute, Carnegie Mellon University, Tech. Rep. CMU-RI-TR-05-09, 2005.

International Search Report for PCT/AU2014/000174, dated Apr. 3, 2014; ISA/AU.

D. Gonzalez-Aguilera, P. Rodriguez-Gonzalvez and J. Gomez-Lahoz, Camera and Laser Robust Integration in Engineering and Architecture Applications, 10 pages, 2010, Sciyo, Croatia.†

D. González-Aguilera, P. Rodriguez-Gonzalvez, J. Armesto, S. Lagüela, Novel approach to 3D thermography and energy efficiency evaluation, 8 pages, 2012, Elsevier, Netherlands.†

Y. Cho and C. Wang, 3D Thermal Modeling for Existing Buildings Using Hybrid LIDAR System, 8 pages, 2011, US.†

D. Borrmann, H. Afzal, J. Elseberg, and A. Nüchter, Mutual Calibration for 3D Thermal Mapping, 6 pages, 2012, Elsevier, Netherlands.†

Y. Ham and M. Golparvar Fard, Rapid 3D Energy Performance Modeling of Existing Buildings Using Thermal and Digital Imagery, 10 pages, 2012, ASCE, US.†

S. Lagüela, L. Díaz-Vilariño, J. Armesto, P. Arias, and C. L. M. Vigo, Thermographic 3D models as the foundation for Building Information Models, 10 pages, 2012, 11th International Conference on Quantitative InfraRed Thermography, Italy.†

M. Cabrelles, S. Galcera, S. Navarro, J. L. Lerma, T. Akasheh, and N. Haddad, Integration of 3D laser scanning, photogrammetry and thermography to record architectural monuments, 2009, 6 pages, in Proceedings of the 22nd CIPA Symposium, Japan.†

R. Yang and Y. Chen, Design of a 3-D infrared imaging system using structured light, 2011, 10 pages, IEEE, US.†

D. Iwaszczuk, L. Hoegner, and U. Stilla, Matching of 3D building models with IR images for texture extraction, 4 pages, 2011, IEEE, US.†

\* cited by examiner
† cited by third party

3D IMAGING METHOD AND SYSTEM

CROSS REFERENCE TO RELATED APPLICATIONS

This application is a U.S. National Phase Application under 35 U.S.C. 371 of International Application No. PCT/AU2014/000174 filed on Feb. 25, 2014 and published as WO 2014/127431 A1 on Aug. 28, 2014. This application is based on and claims the benefit of priority from Australian Application No. 2013900667 filed on Feb. 25, 2013. The entire disclosures of all of the above applications are incorporated herein by reference.

FIELD OF THE INVENTION

The present invention relates to three-dimensional imaging. In particular, although not exclusively, the invention relates to a system and method for three-dimensional imaging utilising thermal infrared image data.

BACKGROUND TO THE INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Energy sustainability is a major challenge of the 21st century in the face of climate change. In order to reduce environmental impact such as greenhouse gas emissions, changes are required not only on the supply side of the energy chain but also on the demand side in reducing energy usage and improving energy efficiency.

Energy auditing is therefore often required to assess energy efficiency of buildings. Thermal infrared imaging is used for energy auditing assessments, in which energy flow is analysed for the purpose of identifying thermal infrared irregularities such as thermal infrared defects, air leakages, heat losses and thermal infrared bridges, energy wastage and energy inefficiency. Such energy audits rely on two-dimensional thermal infrared images of relevant parts of the building, such as furnaces, windows and other areas where energy inefficiencies are common.

A thermal infrared image sensor captures emitted or reflected thermal infrared radiation from objects and typically represents the thermal infrared data as a colour-mapped image, or a group of such images. The thermal infrared data is mapped to colour values to simplify visualisation of otherwise invisible thermal infrared radiation.

A problem with such energy auditing systems of the prior art is that they lack information on the location and orientation of objects with reference to each other, particularly across separate images. Generally, discrete objects are viewed separately, and are not considered in the context of other objects.

A further problem with such energy auditing systems of the prior art is that the thermal infrared imaging indirectly measures a temperature of an object by capturing thermal infrared radiation from a surface of the object. The captured thermal infrared radiation can, however, comprise a thermal infrared reflection from another object. The problem is exaggerated in windows and other objects having a "shiny" surface, as thermal infrared radiation is more likely to be reflected.

Thermal infrared imaging has also been demonstrated to be an effective tool for medical diagnosis. Thermal infrared cameras are able to discern abnormal temperature patterns, making them useful for medical diagnosis, treatment, examination and general health monitoring. Additionally, thermal infrared imaging is non-invasive, does not require skin contact and is radiation free. Medical applications of thermal infrared imaging include breast cancer detection, neonatal health monitoring, and neuro-imaging.

Medical thermal infrared imaging typically involves viewing a two-dimensional image of a person (or a part of a person). A problem with medical thermal infrared imaging of the prior art is that imaging artefacts are often present on edges of objects, objects far from the sensor, or areas where an angle of incidence is great. Similarly, it is often difficult for a medical practitioner to analyse a static two-dimensional thermal infrared image and compare thermal infrared images taken at different times, distances and angles Certain systems have attempted to overcome some of these problems by using three-dimensional thermal infrared imaging. Such systems typically utilize an array of fixed-position thermal infrared sensors, which together are able to generate a three-dimensional thermal infrared model.

One problem with such systems is that they are costly, as several thermal infrared sensors are required. A further problem with such systems is that they are unable to map arbitrarily sized structures. This can, for example, result in a different configuration being required for full-body analysis than for analysis of a smaller body part such as a foot.

Yet a further problem of prior art medical thermal infrared imaging systems is that they may need to be repositioned and recalibrated at several locations around the patient in order to take multiple views. Calibration of these systems is also complex and generally requires the expertise of a trained engineer.

A general problem with thermal infrared imaging of the prior art is that the thermal infrared image data often varies depending on an angle and distance between the object and the camera during capture. This prevents quantitative and repeatable measurements unless monitoring is performed at the exact same position and angle with respect to the object at different times.

Accordingly, there is a need for an improved three-dimensional imaging method and system.

SUMMARY OF THE INVENTION

The present invention seeks to provide consumers with improvements and advantages over the above described prior art, and/or overcome and alleviate one or more of the above described disadvantages of the prior art, and/or provide a useful commercial choice.

According to one aspect the present invention seeks to provide a system for generating a three-dimensional model of an object, the system including:
a portable hand-held imaging device including:
a housing;
a plurality of sensors attached to the housing;
at least one electronic processing device coupled to the plurality of sensors, wherein the electronic processing device:
determines from the plurality of sensors and whilst the imaging device is in at least two different poses relative to the object:
range data indicative of a range of the object;
thermal infrared data indicative of a thermal infrared image of the object;

generates a three-dimensional model based at least partially upon the range data from the at least two different poses; and associates model data derived from the thermal infrared data from the at least two different poses with the three dimensional model to thereby provide a three dimensional thermal infrared model of the object.

Typically the electronic processing device:

determines colour data indicative of a visible image of the object; and associates model data derived from the visible image data from the at least two different poses with the three dimensional model to thereby provide a three dimensional colour model of the object.

Typically the electronic processing device generates a three dimensional fused thermal infrared and colour model of the object.

Typically the system includes:

a range sensor attached to the housing that senses a range of the object:

a visible light image sensor attached to the housing that senses a visible image of the object; and a thermal infrared image sensor attached to the housing that senses a thermal infrared image of the object.

Typically the electronic processing device:

determines a relative pose of the hand-held device; and, uses the relative pose to generate the three dimensional model.

Typically the electronic processing device determines the relative pose of the hand-held device using at least one of range data, image data and thermal infrared data from at least some of the different poses.

Typically the electronic processing device:

estimates a timing skew between the range sensor and at least one of a thermal infrared image sensor and a visible light image sensor; and estimates a pose associated with the image data and/or the thermal infrared data based upon the skew.

Typically the electronic processing device:

determines a device pose using at least one of the range sensor and a pose sensor;

determines a path of movement of the hand-held device;

determines a visible light image sensor pose and a thermal infrared image sensor pose based on the device pose and the path of movement.

Typically the system includes a pose sensor and wherein the electronic processing device determines the relative pose using pose data from the pose sensor.

Typically the pose sensor is at least one of an orientation sensor and an inertial measurement unit.

Typically the electronic processing device:

selects an object surface part;

identifies images of the selected object surface part whilst the imaging device is in at least two different poses relative to the object;

identifies at least one image pixel corresponding to the selected object surface part for each identified image; and, uses the identified image pixels to determine the model data.

Typically for a thermal infrared image the model data includes model thermal infrared data indicative of a temperature and for a visible image the model data includes model colour data indicative of a colour.

Typically the electronic processing device associates the data with a voxel in the three dimensional model corresponding to the selected object surface part.

Typically the selected object surface part is a vertex.

Typically the electronic processing device determines the model data using a weighted sum of data associated with the identified pixels.

Typically the electronic processing device determines the weighted sum using a confidence score associated with the identified pixels.

Typically the electronic processing device determines the confidence score based on factors including at least one of:

a velocity of a sensor when the image was captured;

a position of the one or more pixels in a field of view of the sensor;

an angle between a ray and an object surface, the ray extending from the object surface part to the sensor; and, the range when the image was captured.

Typically, for a thermal infrared image, the electronic processing device determines the confidence score based on a temperature value associated with the identified pixels.

According to one aspect the present invention seeks to provide a method of generating a three-dimensional model of an object, the method including, in an electronic processing device:

determining from the plurality of sensors and whilst an imaging device is in at least two different poses relative to the object:

range data indicative of a range of the object;

thermal infrared data indicative of a thermal infrared image of the object;

generating a three-dimensional model based at least partially upon the range data from the at least two different poses; and associating model data derived from the thermal infrared data from the at least two different poses with the three dimensional model to thereby provide a three dimensional thermal infrared model of the object.

According to one aspect, the invention resides in a system for generating a three-dimensional model of an object, the system including:

a portable imaging device including:

a housing;

a range sensor attached to the housing;

a visible light image sensor attached to the housing; and an thermal infrared image sensor attached to the housing, wherein the range sensor, the visible light image sensor and the thermal infrared image sensor have overlapping fields of view;

at least one processor coupled to the range sensor, the visible light image sensor and the thermal infrared image sensor of the portable imaging device; and a memory, coupled to the at least one processor, including instruction code executable by the processor for:

receiving range data from the range sensor, image data from the visible light image sensor, and thermal infrared data from the thermal infrared image sensor;

generating a three-dimensional model based upon the range data captured from several positions; and associating data from the image data and the thermal infrared data, from at least two positions, with the three dimensional model.

Preferably, associating the image data and the thermal infrared data with the three-dimensional model comprises estimating a timing skew between the range sensor and at least one of the visible light image sensor and the thermal infrared image sensor, and estimating a pose associated with the image data and/or the thermal infrared data based upon the skew.

Preferably, thermal infrared data is associated with the three-dimensional model based at least partly upon an angle of incidence. Suitably, thermal infrared data is associated with the three-dimensional model further based upon a capture distance, environmental data, such as temperature data, or any other data indicative of a confidence of the thermal infrared data.

Preferably, the portable imaging device further comprises an orientation sensor.

Preferably, the system further comprises at least one environmental sensor, wherein the thermal infrared data is associated with the three-dimensional model based upon data from the at least one environmental sensor. Suitably, the at least one environmental sensor comprises a carbon dioxide sensor, a humidity sensor and/or a temperature sensor.

Preferably, the system further comprises an audio sensor for recording an operator's voice during operation of the system.

Preferably, the housing of the portable imaging device comprises an elongate portion, wherein the range sensor, visible light image sensor and thermal infrared image sensor are attached to an end of the elongate portion.

Preferably, the housing of the portable imaging device further comprises a trigger for activating at least one of the range sensor, the visible light image sensor and the thermal infrared image sensor.

Preferably, the at least one processor is coupled to the range sensor, visible light image sensor and thermal infrared image sensor of the portable imaging device at least in part by a wireless data communication link.

Preferably, the thermal infrared image sensor comprises a thermal infrared sensor.

Preferably, the memory further includes instruction code executable by the processor for:
generating an output image corresponding to a view of the three-dimensional model, the output image including at least part of the associated image data superimposed on the model and at least part of the associated thermal infrared data superimposed on the model.

Preferably, the output image is generated by rendering at least part of the associated visible light image data on a first portion of the model and at least part of the associated thermal infrared data on a second portion of the model.

Preferably, the three-dimensional model corresponds to at least a part of a person's body and the associated image data includes skin tones of the person.

Preferably, the memory further includes instruction code executable by the processor for refining the three-dimension model based upon the image data and/or the thermal infrared data.

Preferably, the a portable imaging device further includes a display, for displaying data captured from one or more of the range sensor, visible light image sensor and thermal infrared image sensor, in real time as it is captured.

According to a second aspect, the invention resides in a method of generating a three-dimensional model of an object, the method including:
receiving, from a range sensor, a visible light image sensor and an thermal infrared image sensor, range data, image data and thermal infrared data, wherein the range sensor, the visible light image sensor and the thermal infrared image sensor have overlapping fields of view, and wherein the range data, image data and thermal infrared data each correspond to data from at least two different positions of the range sensor, visible light image sensor and thermal infrared image sensor;
generating a three-dimensional model based upon the range data; and associating data from the image data and the thermal infrared data, corresponding to at least two different positions, with the three dimensional model.

Preferably, the at least two different positions comprise arbitrary positions, wherein at least a part of an object visible in a first position of the at least two different positions is visible in a second position of the at least two positions.

Preferably, the arbitrary positions comprise overlapping views caused by movement of the range sensor, the visible light image sensor and the thermal infrared image sensor across the object.

Preferably, the method further comprises generating an output image corresponding to a view of the three dimensional model, the output image including at least part of the associated image data superimposed on the model and at least part of the associated thermal infrared data superimposed on the model.

It will be appreciated that the different aspects of the invention and their respective features can be used in conjunction or interchangeably and reference to them as separate aspects is not intended to be limiting.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 2b illustrates a side view of the portable imaging device of FIG. 2a;

FIG. 3b illustrates a side view of the portable imaging device of FIG. 3a;

Figure 1:
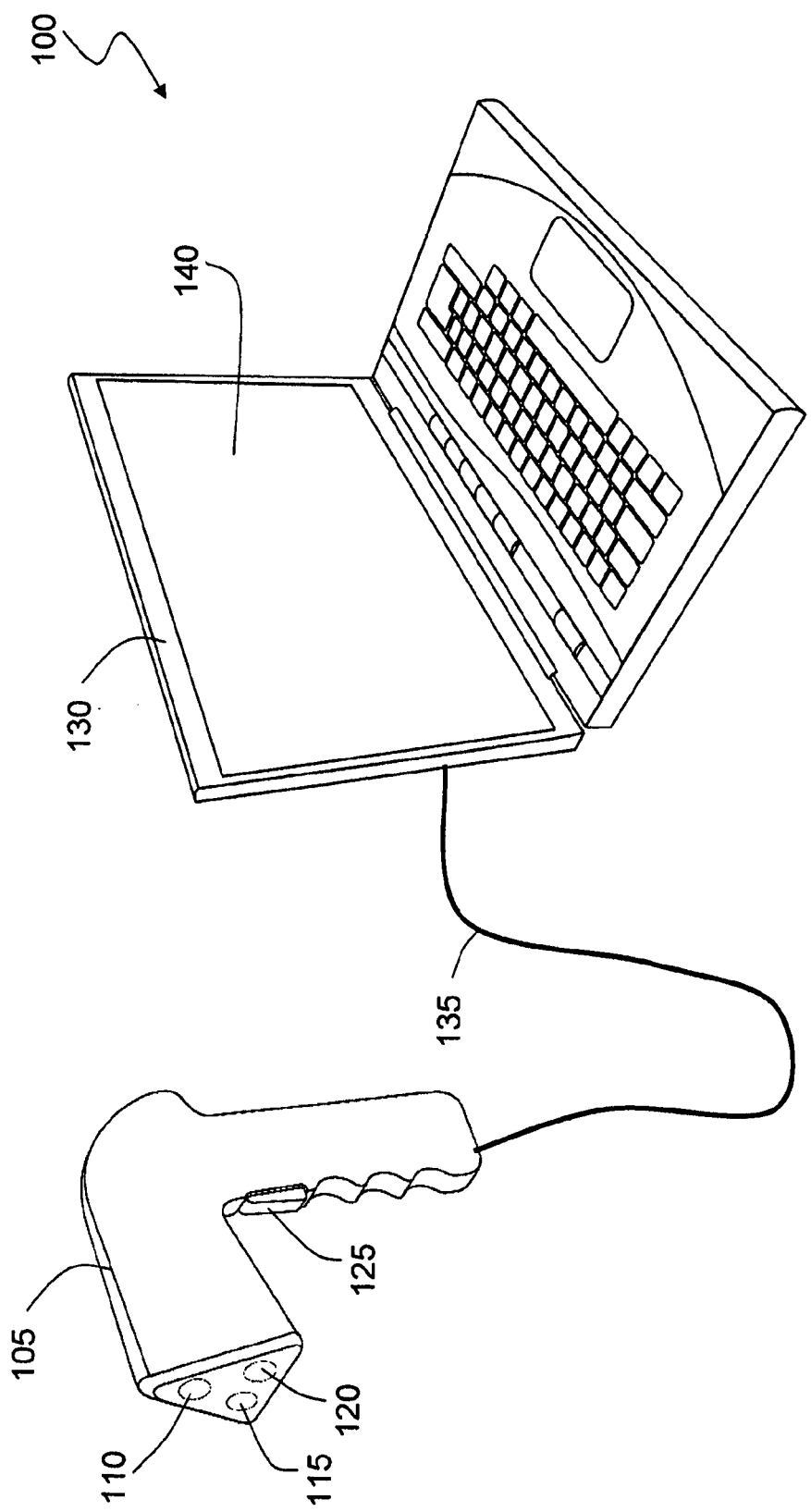
FIG. 1 illustrates a system for generating a model of an object, according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise three-dimensional imaging devices and methods. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect the invention seeks to provide a system for generating a three-dimensional model of an object, the system including: a portable hand-held imaging device including: a housing; a plurality of sensors attached to the housing; at least one electronic processing device coupled to the plurality of sensors, wherein the electronic processing device: determines from the plurality of sensors and whilst the imaging device is in at least two different poses relative to the object: range data indicative of a range of the object; thermal infrared data indicative of a thermal infrared image of the object; generates a three-dimensional model based at least partially upon the range data from the at least two different poses; and associates model data derived from the thermal infrared data from the at least two different poses with the three dimensional model to thereby provide a three dimensional thermal infrared model of the object.

According to one aspect, the invention resides in a system for generating a three-dimensional model of an object, the system including: a portable imaging device including: a housing; a range sensor attached to the housing; a visible light image sensor attached to the housing; and an thermal infrared image sensor attached to the housing, wherein the range sensor, the visible light image sensor and the thermal infrared image sensor have overlapping fields of view; at least one processor coupled to the range sensor, the visible light image sensor and the thermal infrared image sensor of the portable imaging device; and a memory, coupled to the at least one processor, including instruction code executable by the processor for: receiving range data from the range sensor, image data from the visible light image sensor, and thermal infrared data from the thermal infrared sensor; generating a three-dimensional model based upon the range data captured from several positions; and associating data from the image data and the thermal infrared data from at least two positions with the three dimensional model.

Advantages of some embodiments of the present invention can include an ability to generate a holistic and geometrically accurate three-dimensional model of an object including thermal infrared and optionally visible image data, without requiring complex and/or expensive hardware. Such three-dimensional models can be acquired at different times and be aligned and compared to detect any spatio-temporal changes.

The present invention seeks to provide improved accuracy of thermal infrared data, particularly where reflective objects are present, or other factors are present that would otherwise cause artefacts or errors in the thermal infrared data. The accuracy of thermal infrared data can be improved since thermal infrared data can be captured from several angles and distances, and only thermal infrared data with little or no thermal infrared reflection or noise can be selected.

The present invention can also enable rapid three-dimensional visualization of thermal infrared information, which is particularly advantageous, for example, in the context of fire management and response, as well as within an electrical, mechanical or structural building inspection.

The three-dimensional model provides an opportunity for a user to investigate and detect thermal infrared anomalies of an element or object, in a context of its surroundings. Such three-dimensional models can be utilized by inspectors for monitoring non-visible thermal infrared irregularities of buildings, or by medical practitioners to identify thermal infrared anomalies in a patient's body.

According to certain embodiments, image and thermal infrared data can be viewed together on a single model, which enables more accurate localisation of problems. For example, in an electrical maintenance context, the present invention enables a user to determine which of many electrical connections is heating up abnormally due to a faulty connection. The image data enables the user to view a text or colour-based label, whereas the thermal infrared data can be used to detect the heat flows caused by the fault. Similarly, colour-coded pipes and wires can be identified by the image data.

Further, embodiments of the present invention are able to operate in darkness, which is advantageous when explicit night-time analysis is called for by applications such as building energy auditing. Additionally, patients may prefer to be scanned in darkness rather than a bright room. Thus, it will be appreciated that the collection of visible image information is not necessarily required, depending on the circumstances in which the system is to be used.

Finally, embodiments of the present invention do not necessarily require an external tracking device in order to accurately estimate a pose of the device, and can be implemented using simple, off-the-shelf components, although optionally external tracking can be used to improve pose determination, for example in the event that high resolution thermal infrared mapping is required, for example in medical applications.

FIG. 1 illustrates a system 100 for generating a model of an object, according to an embodiment of the present invention. The system 100 can be used for various purposes such as energy-efficiency monitoring, non-destructive structural, mechanical and electrical assessment, construction monitoring, fire detection, by first responders when analysing an emergency scene, and in non-invasive medical diagnosis.

The system 100 includes a portable imaging device 105, for capturing images of the object from various, advantageously overlapping perspectives.

The portable imaging device 105 includes a range sensor 110, a visible light image sensor 115 and an thermal infrared image sensor 120. The range sensor 110, the visible light image sensor 115 and the thermal infrared sensor 120 are fixedly attached to a housing of the portable imaging device 105 in a spaced relationship, and are directed in a common direction. Accordingly, in use, the range sensor 110, the visible light image sensor 115 and the thermal infrared sensor 120 capture substantially the same view of the object; however, as discussed further below hard synchronisation of the sensors 110, 115, 120 is not required. Additionally, whilst three discrete physical sensors are shown, this is not essential and alternatively, two or more sensors can be used. For example, a range and thermal infrared sensor only may be used if visible image sensing is not required. Alternatively, in the event that dual purpose sensors are used, three sensors may not be required, so for example in the event that the range sensor is also capable of sensing a visible image, for example if stereoscopic range sensing is used, then a separate range and visible sensor may not be required.

The visible light image sensor 115 determines colour data, such as RGB data, indicative of a visible image of the object and is typically capable of detecting light that is visible to the human visual system, e.g. with wavelengths from around 390 nm to 700 nm, and in particular a visible image. The thermal infrared sensor 120 is designed to determine thermal infrared data indicative of a thermal infrared image of the object and in particular to detect thermal infrared radiation beyond the visible spectrum, such as wavelengths between 8 μm and 14 μm. Thermal infrared radiation in this portion of the electromagnetic spectrum is emitted from objects based on their temperatures. The thermal infrared sensor 120 can capture this thermal infrared radiation and estimate a surface temperature of the objects based thereon. The range sensor 110 can determine range data indicative of a range of the object, and can be one of a variety of commercially available electromagnetic or ultrasonic proximity sensors, which are well known in the art. The visible light image sensor 115 can be a standard camera, as are well known in the art. An example of the thermal infrared sensor 120 is the Thermoteknix Miricle 307K camera of Thermoteknix Systems Ltd., Cambridge, United Kingdom. However, other types of thermal infrared sensors can be used.

The housing of the portable imaging device 105 further includes a trigger 125 for activating capture of data from the portable imaging device 105. Typically, in use, the user presses the trigger 125 to activate capture of data, and presses the trigger 125 again to deactivate capture of data. Alternatively, the user holds down the trigger 125 to activate the capture of data, and releases the trigger 125 to deactivate the capture of data.

Either way, data can be captured while moving the portable imaging device 105 around the object, thus capturing a sequence of images of the object from different angles and/or positions. However, as will be understood by the skilled addressee, the portable imaging device 105 can be used to capture discrete thermal infrared and/or visible light images of the object from different angles by manually pressing the trigger 125 at different points.

The portable imaging device 105 is connected to a computing apparatus 130, via a signal cable 135. However, as will be readily understood by the skilled addressee, the signal cable 135 can be replaced by wireless communication between the portable imaging device 105 and the computing apparatus 130. Examples of wireless communication techniques include wireless local area networks (WLANs) according to Institute of Electrical and Electronics Engineers (IEEE) 802.11 standards, short-wavelength radio transmissions such as Bluetooth and near-field communication based upon radio-frequency identification (RFID) standards.

The computing apparatus 130, described in further detail below, includes at least one processor (not shown) and a memory (not shown). The processor is coupled to the range sensor 110, the visible light image sensor 115 and the thermal infrared sensor 120 by the signal cable 135 and a data interface (not shown).

The memory includes instructions for receiving a plurality of range images from the range sensor 110, a plurality of images of the visible light image sensor 115, and a plurality of thermal infrared images from the thermal infrared sensor 120. Upon receipt of the images, a three-dimension model is generated based upon the plurality of range images. According to certain embodiments, the thermal infrared image from the thermal infrared sensor 120 and/or the images from the visible light image sensor 115 can be additionally used to generate and/or refine the three-dimensional model.

After generating the three dimensional model, typically using the range data, data from the plurality of images of the visible light image sensor 115 and the plurality of thermal infrared images from the thermal infrared sensor 120 are associated with the three-dimensional model. This can, for example, comprise associating image and thermal infrared data to all or some points or parts of the three-dimensional model. Typically this involves creating model data, with the model data being based on the thermal infrared data and optionally colour data for at least two different poses of the hand-held device, as will be described in more detail below.

The range sensor 110, the visible light image sensor 115 and the thermal infrared sensor 120 generally require geometrical and temporal calibration with respect to each other.

The points of view of each of the sensors 110, 115, 120 of the portable imaging device 105 are different since they are geometrically separated. Geometric calibration is thus performed to determine relative positions and orientations between the sensors 110, 115, 120, as well as internal parameters of the sensors 110, 115, 120, such as focal length. Additionally, a relative timing between the range sensor 110, the visible light image sensor 115 and the thermal infrared sensor 120 also can be determined, if required, for example in the event that the sensors do not use a common clock signal when capturing data.

Relative poses (i.e. positions and orientations) of the sensors 110, 115, 120 are thus determined. This may be performed at a time of manufacture, or periodically by the user if there is a risk of relative movement among the sensors 110, 115, 120.

Any of several range-image geometric calibration techniques known in the art can be used. For example, a range-image geometric calibration algorithm typically requires external artificial targets to be observed simultaneously from the range and imaging sensors. A checkerboard pattern is a common external target. Examples of such range-image geometric calibration techniques are described in Q. Zhang and R. Pless, "Extrinsic calibration of a camera and laser range finder (improves camera calibration)," in Proceedings of the IEEE/RSJ International Conference on Intelligent Robots and Systems, vol. 3, 2004, pp. 2301-2306, and R. Unnikrishnan and M. Hebert, "Fast extrinsic calibration of a laser rangefinder to a camera," Robotics Institute, Carnegie Mellon University, Tech. Rep. CMU-RI-TR-05-09, 2005.

Alternatively, a set of natural scene feature correspondences are extracted from the thermal infrared data, visible image data and the range data respectively. Once the correspondences are known, the rigid transformation between the two reference frames can be determined using an iterative non-linear optimization minimizing a distance between corresponding pairs. Finally, transformations having six degrees of freedom are generated, transforming the thermal infrared data, range data and visible image data to a common coordinate system, thus providing the relative poses of the sensors 110, 115, 120.

During use, a relative pose of each of the sensors 110, 115, 120 can be determined as the portable imaging device 105 is moved around an object. As data from the sensors 110, 115, 120 is not necessarily captured in a synchronised manner, range data captured using the range sensor 110 may correspond to a slightly different pose than thermal infrared data captured from the thermal infrared sensor 120. A pose is therefore generated from the range sensor data, which is then used as a basis for estimating a pose corresponding to the thermal infrared data and visible image data.

Specifically, four neighbouring range frames are selected, two immediately preceding the thermal infrared or visible image data in question, and two immediately following. A cubic spline is fitted to four poses corresponding to the four neighbouring range frames, representing the three-dimensional path of movement of the portable imaging device 105 throughout this interval. The pose of the portable imaging device 105 corresponding to the time the thermal infrared or visible image data was captured is estimated using a spline, which is then transformed to a pose of the relevant sensor 115, 120 using the relative positions of the sensors 110, 115, 120.

Therefore, some parts of the object during scanning may be occluded for the sensors 110, 115, 120. According to certain embodiments, range points from the three-dimensional model are first projected into image planes. Then, a k-nearest neighbours (KNN) search is utilized to cluster neighbouring projected points based on their distance to the portable imaging device and a size of the cluster. Points that have a large distance to the centre of the cluster are then discarded as outliers, and potentially occluded points.

Depending on the field of view of each sensor 110, 115, 120, some points might be outside of the field of other sensors 110, 115, 120 and therefore may not be able to have an assigned temperature or colour.

Capture of data from the range sensor 110, the visible light image sensor 115 and the thermal infrared sensor 120 does not need to be synchronised. Instead, respective poses of images from the visible light image sensor 115 and thermal infrared images from the thermal infrared sensor 120 can be determined by analysing a relative timing of the images compared with the range images, for which a capture time is known, together with a pre-determined knowledge of the relative poses of the sensors 110, 115, 120. Relative pose is generated by interpolating between poses based on an estimate of timing skew between sensors 110, 115, 120.

Weighted averaging raycasting then can be used to project data from the images to the three-dimensional model, using knowledge of the geometry of the sensors 110, 115, 120 of the portable imaging device 105. This process can comprise colouring voxels of the three-dimensional model, as well as assigning temperature values to each voxel from multiple views.

Accuracy of thermal infrared data is improved as the thermal infrared sensor 120 is moved across an object's surface to obtain multiple overlapping readings. Anomalies caused by reflections from windows or shiny materials, and local environmental factors such as humidity thus can be compensated for.

According to certain embodiments, an uncoloured three-dimensional voxel occupancy map is first created using the range data. The voxel occupancy map is then converted to a dense three-dimensional model using the marching cubes algorithm, which is later simplified using a quadric-based edge collapse algorithm, which algorithms are well known in the art. Weighted raycasting is then performed for each valid frame from both the thermal infrared sensor 120 and the visible light image sensor 115, in order to assign visible image and thermal infrared data to each vertex in the three-dimensional model.

According to certain embodiments, thermal infrared data is selectively added to the three-dimensional model, based upon an angle of incidence, a distance between the thermal infrared sensor 120 and the surface, environmental sensor data and/or other factors influencing a confidence of the thermal infrared data when captured. Furthermore, a geometric position of pixels in the camera can be a factor influencing confidence of the thermal infrared data, where pixels located towards a centre of the camera have a higher confidence than pixels located towards the corners of the camera. Thus pixels located towards the centre of the camera can be given a higher weight when raycasting.

By capturing thermal infrared data from several positions and selectively choosing which thermal infrared data is added to the three-dimensional model, greater thermal infrared accuracy can be provided.

The three dimensional model then can be rendered on a screen 140 of the computing device 130, including details from the plurality of images of the visible light image sensor 115 and the plurality of thermal infrared images from the thermal infrared sensor 120. As discussed in further detail below, image data from the plurality of images of the visible light image sensor 115 can be rendered on the three-dimensional model to provide a lifelike or realistic appearance, while data from the plurality of thermal infrared images from the thermal infrared sensor 120 can be, for example, overlayed over part of the three-dimensional model to provide thermal infrared information.

The three-dimensional model produced by the system 100 can be used to generate synthetic views at any angle or scale, which may help a user, such as a medical practitioner, to interpret the results more effectively.

After the data has been captured and a three-dimensional model has been generated, it is displayed to the user. According to certain embodiments, the three-dimensional model is displayed to the user in real time as it is being generated and/or refined, enabling the user to stop capturing data when sufficient data is received.

The three-dimensional model is advantageously presented using thermal infrared highlighting, wherein visible image data and thermal infrared data is incorporated into an output image. However, as will be understood by the skilled addressee, any suitable method of presenting the three-dimensional model together with the visible image and thermal infrared data can be provided.

Thermal infrared highlighting involves applying a weighting scheme wherein weights are provided to thermal infrared and visible image data. In its simplest form, the weights are either 0 or 1, wherein either thermal infrared data or visible image data is displayed on a single portion of the output image, however other weights can also be used.

According to certain embodiments, thermal infrared highlighting is used to illustrate thermal infrared extremes. Thus visible image data is rendered in the output image where the thermal infrared data is near average, and thermal infrared data is rendered in the output image where the thermal infrared data is extreme, such as outside given standard deviations above or below a mean value. This serves the purpose of highlighting the "hottest" and/or the "coldest" surfaces with strong colours that make them highly salient to a human viewer, whilst still retaining colour and texture data for the majority of the scene.

In the medical field, the use of visible image data together with thermal infrared data may enhance identification of anomalies by presenting skin irregularities to the user. In the energy monitoring environment, it enables inspectors to know which thermal infrared data relates to what equipment, through images of the equipment's tags and surface colour, which is especially useful when the user wants to use generated images for offline tasks such as, for example, creating energy loss reports requiring an equipment's serial number.

Thermal infrared highlighting can also be applied to emphasize thermal infrared data in a particular range, rather than just the extremes. This is further illustrated below in FIG. 4.

According to certain embodiments, a first three-dimensional model is generated at a first point of time, and a second three-dimensional model is generated at a second point of time. The first and second three-dimensional models are aligned and compared. This can include an overlay of the three-dimensional models, a difference map generated for the visible image and/or thermal infrared data, or a side-by-side presentation of the models. This enables a user to detect thermal infrared changes in an object over time.

Figure 2A:
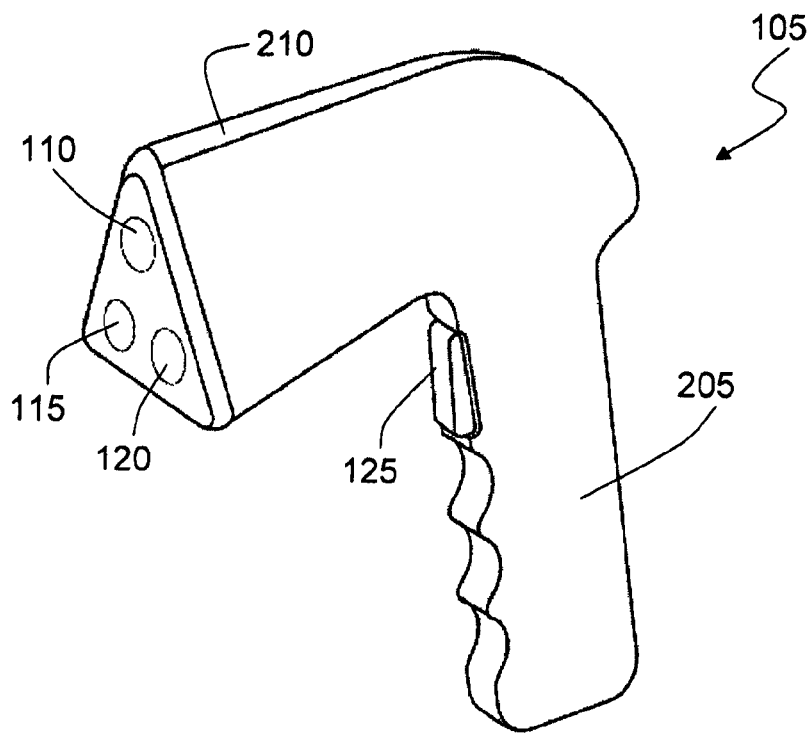
FIG. 2a illustrates a perspective view of a portable imaging device of the system of FIG. 1.
Figure 2B:
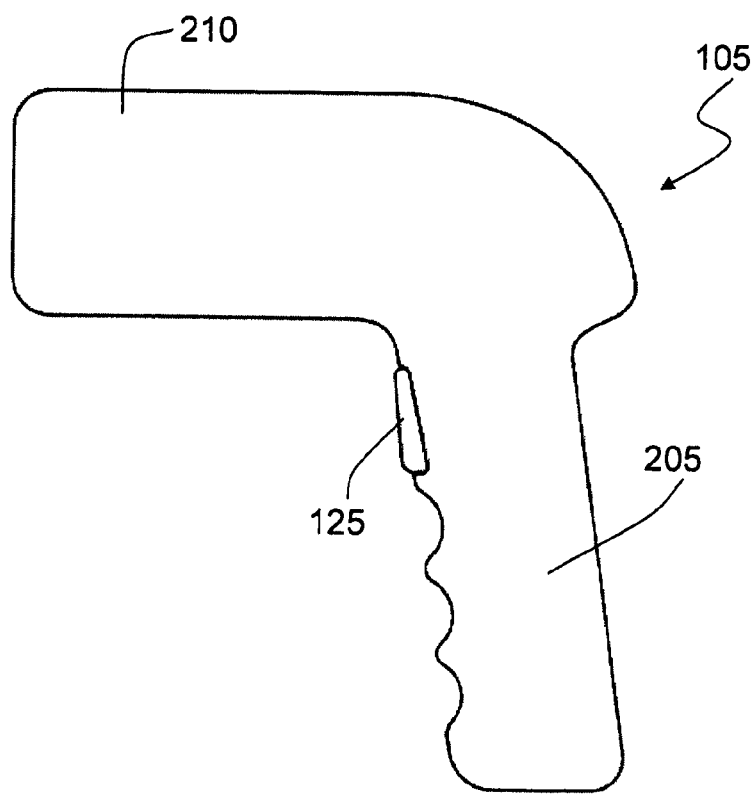

FIG. 2a illustrates a perspective view of the portable imaging device 105. FIG. 2b illustrates a side view of the portable imaging device 105.

As discussed above, the portable imaging device 105 includes the range sensor 110, the visible light image sensor 115 and the thermal infrared sensor 120. The range sensor 110 is positioned on a housing above and between the visible light image sensor 115 and the thermal infrared sensor 120. However, as will be readily understood by the skilled addressee, the range sensor 110, the visible light image sensor 115 and the thermal infrared sensor 120 can be placed in any suitable arrangement.

The housing of the portable imaging device 105 includes a handle portion 205, in which the trigger 125 is incorporated, and an elongate barrel-like portion 210, on the end of which the range sensor 110, the visible light image sensor 115 and the thermal infrared sensor 120 are located. This enables ergonomic, handheld operation of the portable imaging device 105 when moving it around the object, and gives the portable imaging device 105 a pistol-like shape, which makes it particularly easy to use without specific training.

Figure 3A:
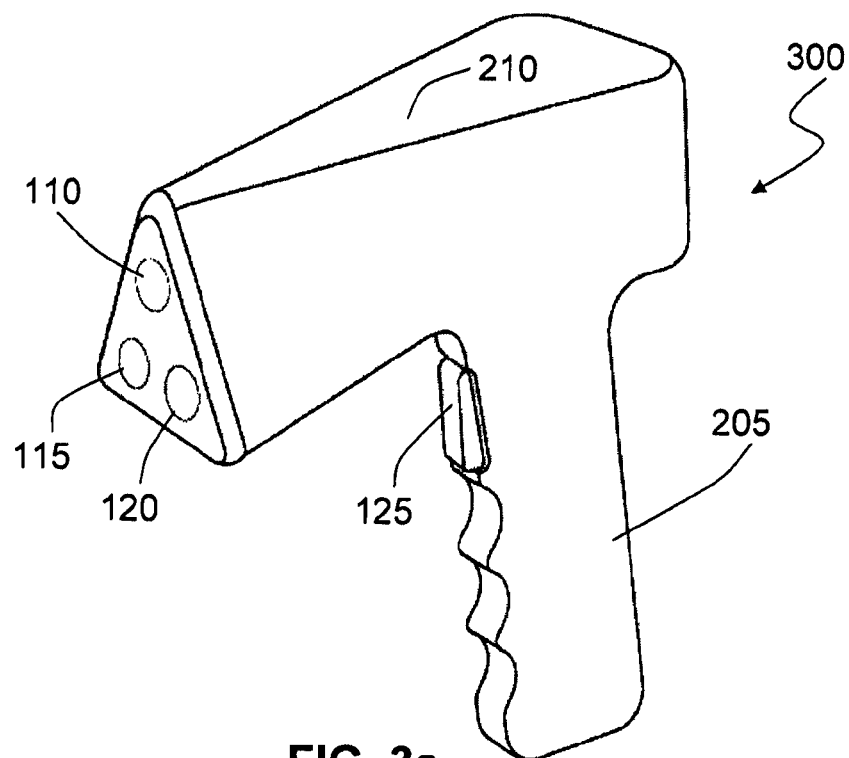
FIG. 3a illustrates a perspective view of a portable imaging device, according to an alternative embodiment of the present invention.
Figure 3B:
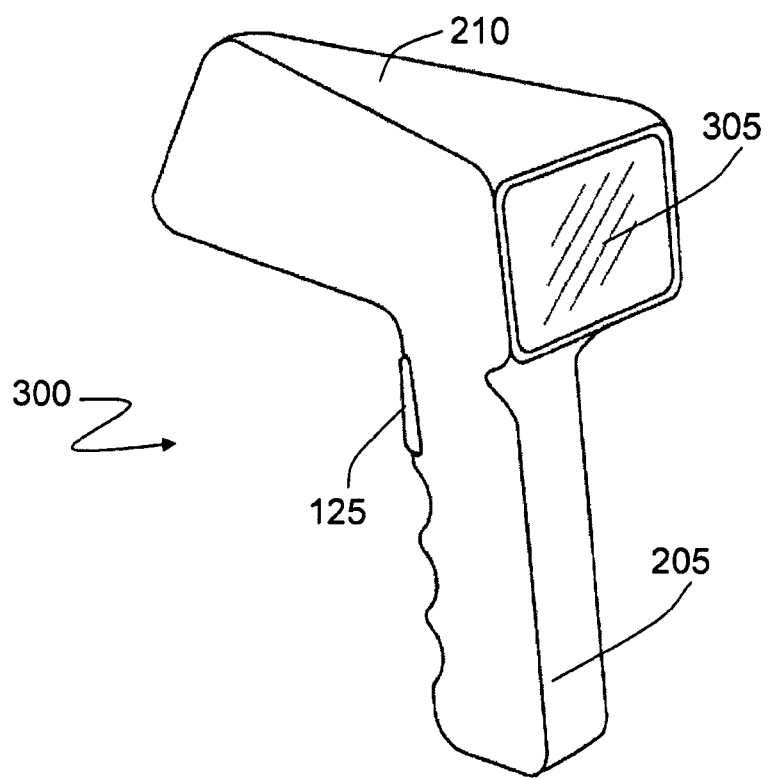

FIG. 3a illustrates a perspective view of a portable imaging device 300, according to an alternative embodiment of the present invention. FIG. 3b illustrates a side view of the portable imaging device 300.

The portable imaging device 300 is similar to the portable imaging device 105 of FIG. 1. The portable imaging device 300 further includes a display screen 305 for displaying a captured image, for example an image received from the visible light image sensor 115.

The display screen 305 enables a user to more accurately target areas of the object, and/or see which areas of the object are currently being scanned. The display screen 305 can comprise a Liquid Crystal Display (LCD), for example, however various other types of display are also suitable.

According to certain embodiments, capture of thermal infrared data is activated by the trigger 125, whereas visible image and range data is continuously captured. This can be used where thermal infrared glare and reflection is a problem, as the user can select poses having minimal glare in real time by viewing the thermal infrared data on the display screen 305.

According to alternative embodiments (not shown), a system for generating a model of the object is housed in a portable imaging device similar to the portable imaging device 300. In such a case, data can be processed and a three-dimensional model can be generated by the portable imaging device. The three dimensional model, with overlaid visible image and thermal infrared data, can then be displayed on a screen of the portable imaging device. This enables the portable imaging device to be a standalone entity.

According to some embodiments of the present invention, an optional orientation or pose sensor (not shown) is provided for measuring the orientation and/or pose of the portable imaging device. The orientation or pose sensor can be of any suitable form, and can include one or more sensors, such as an inertial measurement unit (IMU), attached to the portable imaging device 105, 300. Such an orientation sensor can assist processing data from the sensors 110, 115, 120.

According to further embodiments, the system 100 or the portable imaging device 300 comprises an environmental sensor (not shown). The environmental sensor can estimate and compensate for any environmental impacts on measurements using the thermal infrared sensor 120. Examples of environments sensors include a carbon dioxide sensor, a humidity sensor and/or a temperature sensor.

According to further embodiments, the system 100 or the portable imaging device 300 includes an audio sensor (not shown). The audio sensor enables the user to verbally annotate the model of the object with semantic information such as condition of the objects, add time and date of the inspection or provide more information about an object under examination which are not detectable or visible by either thermal infrared or visible light image sensors. The annotation can then be extracted from recorded voice to text and overlayed on the generated 3D model, for example by storing the text as meta-data associated with the model. The audio sensor can also be used to provide voice commands to the system 100, for example to allow voice actuation of sensing, or the like.

According to yet further embodiments of the present invention, the portable imaging device 105, 300 can be mounted on a mobile platform for fine control motions (such as a mobile robot and/or arm or endoscopes) and/or can be tele-operated and/or pre-programmed and/or autonomously moved to various poses around the object to complete the model.

The three dimensional model can be generated based upon an assumption that the object does not move during the scan and does not deform. However, human subjects may move slightly during a scan period which may cause artifacts in the 3D model. Accordingly, deformable model tracking can be employed to jointly estimate a time-varying, dynamic shape of the object and its motion. This information can be combined with the surface reconstruction to provide a more robust 3D model of the object, and in particular of human and/or animal body parts.

Figure 4:
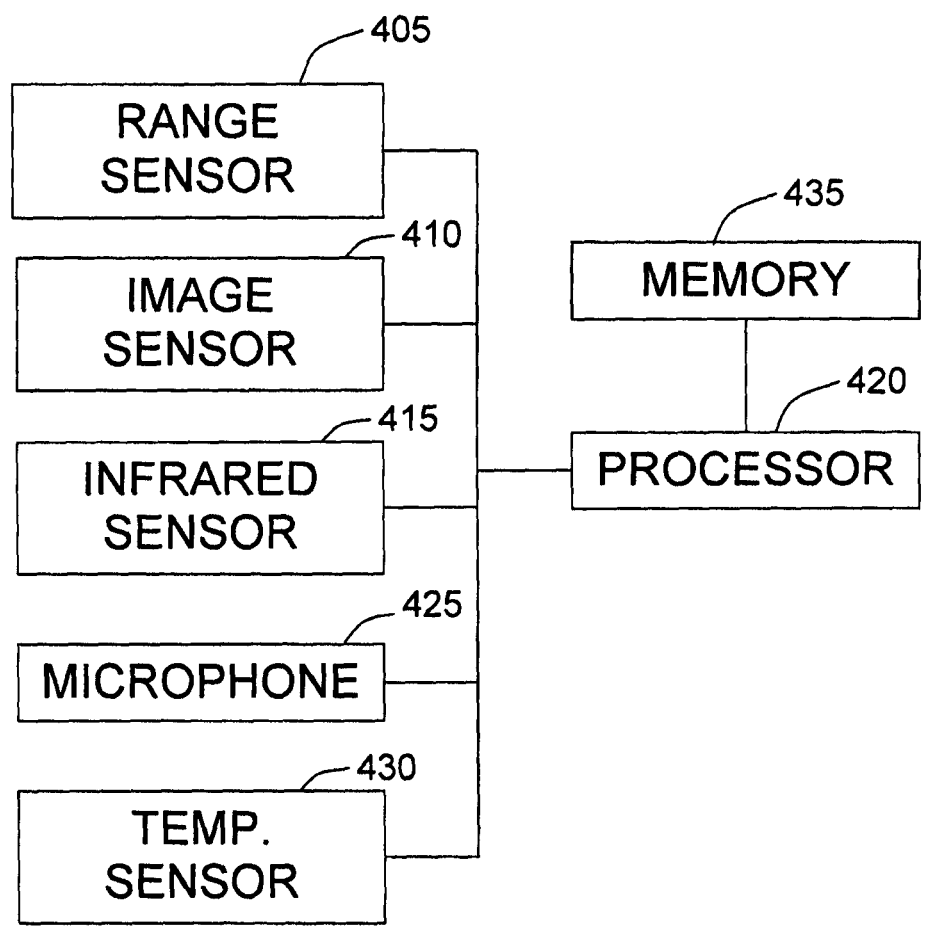
FIG. 4 schematically illustrates a system for generating a model of an object, according to an embodiment of the present invention.

FIG. 4 schematically illustrates a system 400 for generating a model of an object, according to an embodiment of the present invention. The system 400 is similar to the system 100, but with the addition of further sensors, as discussed below.

The system 400 includes a range sensor 405, an image sensor 410 and an thermal infrared sensor 415 similar to the range sensor 110, visible light image sensor 115 and thermal infrared image sensor 120 of FIG. 1, coupled to a processor 420.

The system further includes a microphone 425, for capturing voice from a user, and a temperature sensor 430, for measuring a temperature of the environment in which the system 400 is operating.

The temperature sensor 430 is an example of an environmental sensor, and other environmental sensors can be included in the system 400, including, for example, a carbon dioxide sensor.

The system 400 further includes a memory 435, coupled to the processor 420. The memory 435 includes instruction code executable by the processor 420 for generating a three-dimensional model based upon the range data captured from several positions and associating data from the visible image data and the thermal infrared data, from at least two positions, with the three dimensional model. Thermal infrared data is associated with the three dimensional model based upon an angle of incidence of the thermal infrared data, a distance between the camera and the object during capture, and data from the temperature sensor 430.

Accordingly, the system 400 is able to select thermal infrared data having high confidence values, such as thermal infrared data having a low angle of incidence that is recorded close to the object and away from high temperature areas. Thus thermal infrared reflection and errors in the thermal infrared data caused by local environmental impact can be avoided in the model.

As discussed earlier, the user is able to verbally annotate the model of the object with semantic information or provide more information about an object under examination, and such information is able to be captured by the microphone 425.

Figure 5:
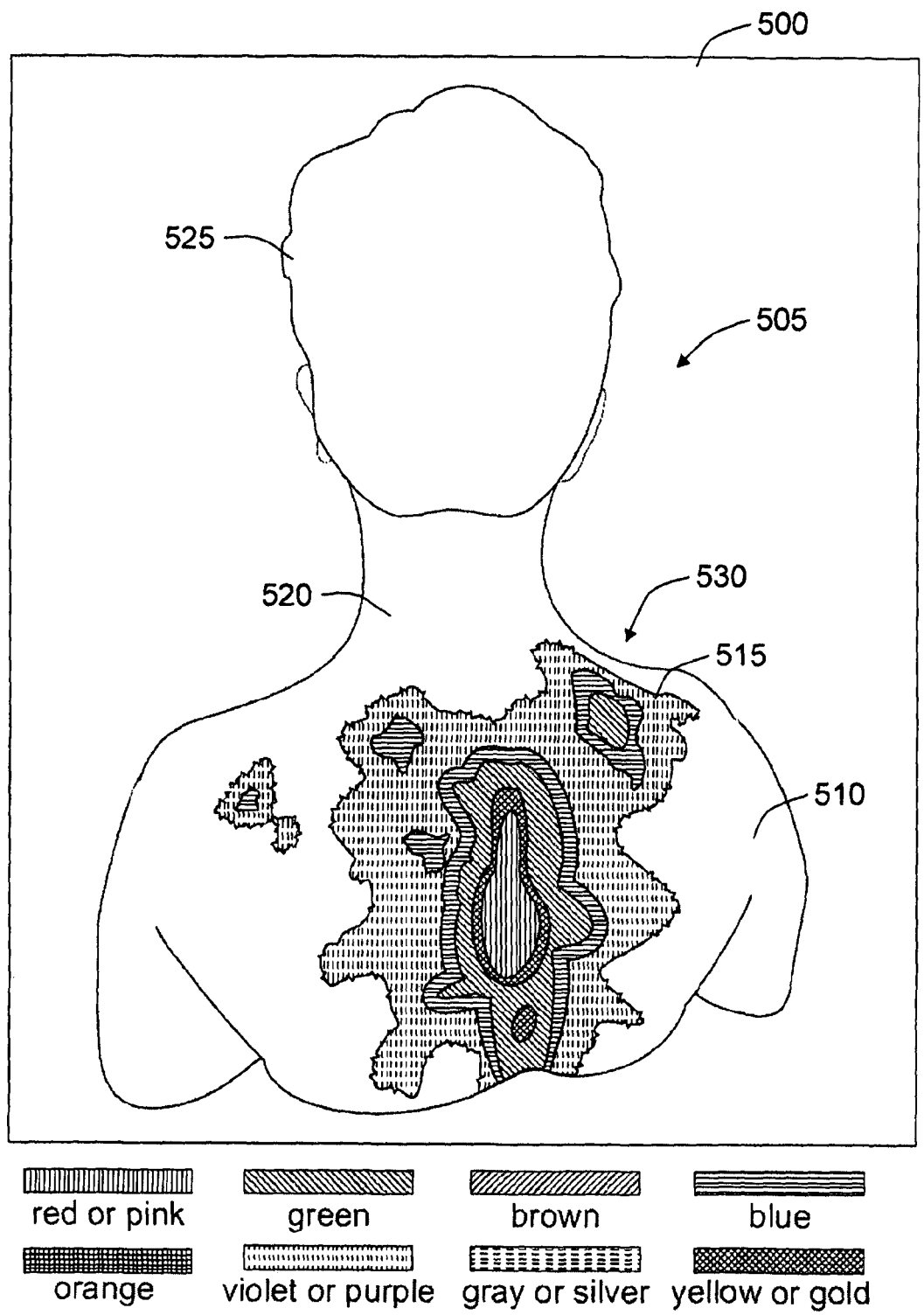
FIG. 5 illustrates a screenshot of a display of the system of FIG. 1, illustrating a rendering of a three-dimensional model with image data and thermal infrared data.

FIG. 5 illustrates a screenshot 500 of a display of the system 100, illustrating a rendering of a three-dimensional model 505 with visible image data 510 and thermal infrared data 515. The three-dimensional model 505 corresponds to an upper body of a person, and the person's upper back is viewed in the screenshot 500.

The visible image data 510 includes skin tone 520, hair colour 525 and other visual identifiers of the person. For example, a tattoo (not shown) or scarring (not shown) can be present in the visible image data 510.

The thermal infrared data 515 comprises thermal infrared data, corresponding to a temperature measured on the skin of the person. The thermal infrared data 515 can be colour coded, for example where purple corresponds to approximately 33.0 degrees Celsius, blue corresponds to approximately 33.2 degrees Celsius, green corresponds to approximately 33.5 degrees Celsius, yellow corresponds to approximately 33.7 degrees Celsius and red corresponds to approximately 34 degrees Celsius.

In the example provided in FIG. 5, the thermal infrared data 515, is rendered onto the three-dimensional model when a temperature of the skin is between 33.0 and 34.0 degrees Celsius. For all temperatures below this range, visible image data 510, including skin tone 520, is displayed. Accordingly, one or more threshold values can be used to determine if thermal infrared data is to be displayed or not.

According to certain embodiments, a user of the system 100 can adjust the temperature range upon which thermal infrared data is overlaid. In one scenario, the user can choose to select to render thermal infrared data over the entire three-dimensional model. In other scenario, a user can choose to render a very narrow range of thermal infrared data corresponding to peak temperatures of the object.

As an example, it is considered that the person rendered in the screenshot 500 has chronic pain in the right-hand shoulder. Thus an asymmetry in the skin temperature can clearly be recognized, in particular in an upper right portion 530 corresponding to the right-hand shoulder.

Variations in surface temperature on the skin are low. Nevertheless, an asymmetry in the heat distribution is apparent, particularly in upper right portion 530, suggesting that there is more blood flowing to the affected (right) shoulder.

Figure 6:
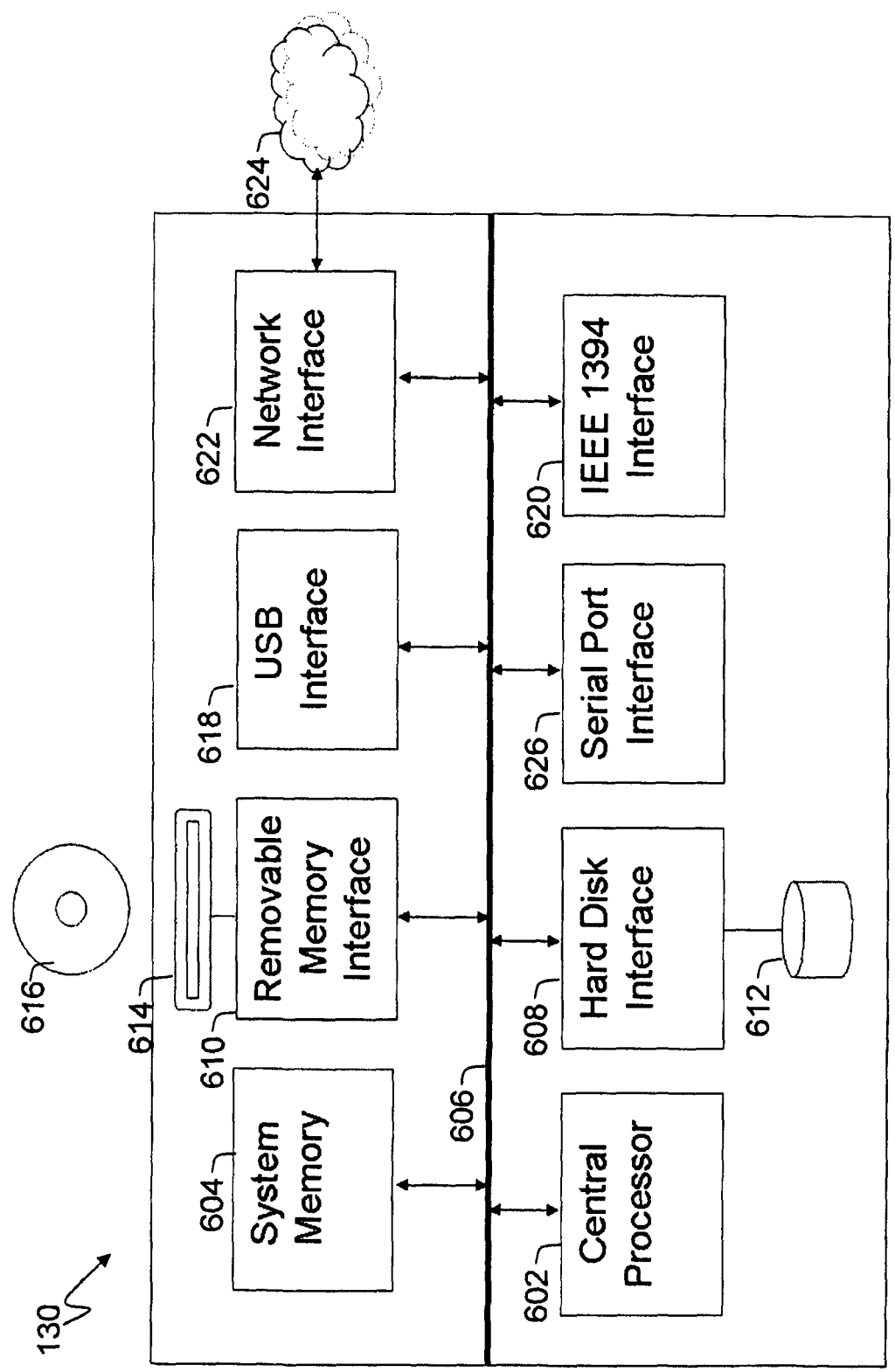
FIG. 6 diagrammatically illustrates the computing apparatus of the system of FIG. 1, according to an embodiment of the present invention.

FIG. 6 diagrammatically illustrates the computing apparatus 130, according to an embodiment of the present invention.

The computing apparatus 130 includes a central processor 602, a system memory 604 and a system bus 606 that couples various system components, including coupling the system memory 604 to the central processor 602. The system bus 606 may be any of several types of bus structures including a memory bus or memory controller, a peripheral bus, and a local bus using any of a variety of bus architectures. The structure of system memory 604 is well known to those skilled in the art and may include a basic input/output system (BIOS) stored in a read only memory (ROM) and one or more program modules such as operating systems, application programs and program data stored in random access memory (RAM).

The computing apparatus 130 may also include a variety of interface units and drives for reading and writing data. In particular, the computing apparatus 130 includes a hard disk interface 608 and a removable memory interface 610, respectively coupling a hard disk drive 612 and a removable memory drive 614 to the system bus 606. Examples of removable memory drives 614 include magnetic disk drives and optical disk drives. The drives and their associated computer-readable media, such as a Digital Versatile Disc (DVD) 616 provide non-volatile storage of computer readable instructions, data structures, program modules and other data for the computer system 600. A single hard disk drive 612 and a single removable memory drive 614 are shown for illustration purposes only and with the understanding that the computing apparatus 130 may include several similar drives. Furthermore, the computing apparatus 130 may include drives for interfacing with other types of computer readable media.

The computing apparatus 130 may include additional interfaces for connecting devices to the system bus 606. FIG. 6 shows a universal serial bus (USB) interface 618 which may be used to couple a device to the system bus 606. For example, an IEEE 1394 interface 620 may be used to couple additional devices to the computing apparatus 130.

The computing apparatus 130 can operate in a networked environment using logical connections to one or more remote computers or other devices, such as a server, a router, a network personal computer, a peer device or other common network node, a wireless telephone or wireless personal digital assistant. The computing apparatus 130 includes a network interface 622 that couples the system bus 606 to a local area network (LAN) 624. Networking environments are commonplace in offices, enterprise-wide computer networks and home computer systems.

A wide area network (WAN), such as the Internet, can also be accessed by the computing apparatus 130, for example via a modem unit connected to a serial port interface 626 or via the LAN 624.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing apparatus 130 can be operated in a client-server configuration to permit a user to retrieve web pages from a web-based server. Furthermore, any of various conventional web browsers can be used to display and manipulate data on web pages.

The operation of the computing apparatus 130 can be controlled by a variety of different program modules. Examples of program modules are routines, programs, objects, components, and data structures that perform particular tasks or implement particular abstract data types. The present invention may also be practiced with other computer system configurations, including hand-held devices, multi-processor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Accordingly, it will be appreciated that the computing apparatus 130 may be formed from any suitable processing system, such as a suitably programmed computer system, PC, web server, network server, or the like. In one particular example, the processing systems 201 are standard processing system, which executes software applications stored on non-volatile (e.g., hard disk) storage, although this is not essential. However, it will also be understood that the processing system could be or could include any electronic processing device such as a microprocessor, microchip processor, logic gate configuration, firmware optionally associated with implementing logic such as an FPGA (Field Programmable Gate Array), or any other electronic device, system or arrangement. The term electronic processing device is therefore intended to cover any suitable processing or computing apparatus, and is not intended to be limiting.

It will also be appreciated that whilst a separate computer system 130 is shown in the above examples, this is not essential and alternatively some or all of the functionality of the computer system 130, could be built into the handset. For example, the hand-held device could include a processor for generating a three dimensional model, with this being transferred wirelessly to a separate display device, such as a tablet computer, mobile phone, or the like. In a further example, the sensors could be integrated into a portable device including sensors, such as a mobile phone, or similar that includes range and thermal sensors. It will be further appreciated that in such a situation, in the event that processing requirements exceed capabilities of the device, the data could be transferred wirelessly to another device for processing, with the model being returned for display in substantially real-time.

Figure 7:
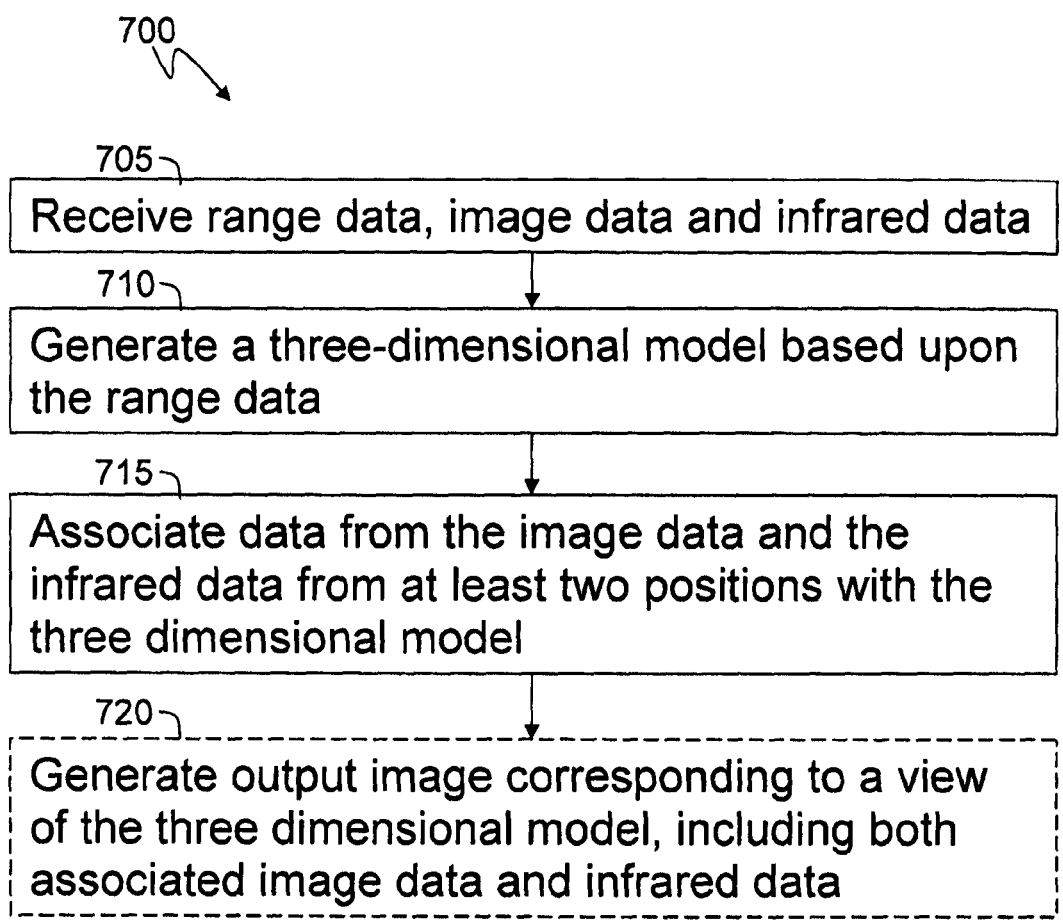
FIG. 7 illustrates a method of generating a three-dimensional model of an object, according to an embodiment of the present invention.

FIG. 7 illustrates a method 700 of generating a three-dimensional model of an object, according to an embodiment of the present invention.

In step 705, range data, image data and thermal infrared data is received from a range sensor, an image sensor and an thermal infrared sensor. The range sensor, the image sensor and the thermal infrared image sensor have overlapping fields of view, and can thus capture data from the object simultaneously. The range data, image data and thermal infrared data each correspond to data from at least two different positions, and typically will include data from several different positions.

In step 710, a three-dimensional model is generated based upon the range data. The three dimensional model is generated based upon the range data from several positions and geometries.

In step 715, data from the image data and the thermal infrared data is associated with the three dimensional model. The data is captured from at least two different positions of the image sensor and the thermal infrared sensor, thus providing more than a single view of image and thermal infrared data. The different positions comprise arbitrary positions, wherein at least a part of the object is visible in a first position of the at least two different positions, and a second part is visible in a second position of the at least two positions. Thus there is no need to follow a strict pattern, or calibrate camera positions.

In step 720, which is an optional step, the method further comprises generating an output image corresponding to a view of the three dimensional model. The output image includes at least part of the associated image data and at least part of the associated thermal infrared data superimposed on the model. One part of the output image can contain thermal infrared data, whereas another part contains image data, for example. Alternatively, image data and thermal infrared data can be combined on a same part of the output image, as discussed above.

Thus, the model can incorporate model data derived from the thermal infrared data and optionally the visible image data allowing a thermal infrared and/or colour model of the object to be provided. Furthermore, the thermal infrared and colour model can be combined in a fused model, so that the fused model highlights specific attributes of interest. For example, the fused model could display colour over a majority of the model, with thermal infrared representations being shown only in the event that temperatures fall outside a predetermined range. Thus parameters for the model can be defined including a normal or expected temperature range, with indications of the temperature being shown in parts of the model where the temperature falls outside the normal or expected range.

In order to generate the model, the computer system, and in particular the electronic processing device selects an object surface part, such as a vertex, or the like, and then identifies images of the selected object surface part whilst the imaging device is in at least two different poses relative to the object. The images will include thermal infrared and/or visible images, allowing temperature or colour to be added to the model. The computer system then identifies at least one image pixel corresponding to the selected object surface part for each identified image and uses the identified image pixels to determine the model data. Thus, by using pixels from multiple different images, this can help in mitigating the effect of reflections, leading to more reliable temperature and/or colour representation.

Typically, the electronic processing device associates the data with a voxel in the three dimensional model corresponding to the selected object surface part. The electronic processing device determines the model data using a weighted sum of data associated with the identified pixels of images from different poses, allowing reflections from the surface of the object to be accounted for. In one example, the electronic processing device achieves this by using a confidence score associated with the identified pixels in different images. The confidence score can be based on factors including at least one of: a velocity of a sensor when the image was captured; a position of the one or more pixels in a field of view of the sensor; an angle between a ray and an object surface, the ray extending from the object surface part to the sensor; and, the range when the image was captured.

Thus, the above described system can generate large-scale 3D models with accurate surface temperature information. This is achieved as the result of two main processes. First, the trajectory of the sensor in 3D space is simultaneously estimated along with the 3D structure of the object or environment being explored. This is done by employing a SLAM (Simultaneous Localization And Mapping) solution that can function in real-time. Second, a raycasting method is applied to accurately assign temperature and colour estimates to the 3D model from multiple views. This method implements a multi-variable weighting scheme to achieve more accurate estimates than previous methods.

Visualization for the output of the system comes in two forms; online/real-time visualization for verification of the completeness and integrity of the model as data is being captured, and offline visualization for in-depth analysis and the optimization of display properties. This visualization capability includes the conversion of the model into one of a number of alternative multimodal representations that allow temperature and visible-spectrum information to be viewed simultaneously.

Offline processing post-capture can be advantageous as the relaxed restrictions on processing time allow more precise and thorough calculations to be performed, resulting in improvements in spatial resolution and accuracy relative to the real-time model. However, it will be appreciated that this will depend on the circumstances in which the system is to be used.

To generate accurate 3D models which can be visualized in real-time, a SLAM solution is used, which utilizes a video stream of range images from the range sensor to continuously update and optimize a 3D voxel model. The algorithm also generates an accurate trajectory estimate of the device throughout the sequence, with 6 degrees of freedom, namely translation about X, Y and Z positions, and rotation about all three axes. In this example, a GPU (Graphics Processing Unit) can be heavily utilized in order to perform this process quickly so that it can keep up with the frame rate of the range sensor.

The first range image received from the range sensor is processed to initialize a voxel occupancy map stored on the GPU. As further range images are received, they are incrementally registered to this 3D model using the Iterative Closest Point (ICP) algorithm. This process also leads to an estimate of the relative six degrees of freedom pose of the camera for the new frame, and this pose is utilized to further optimize the voxel occupancy map.

Thermal infrared data is calibrated so that each pixel of the thermal infrared image contains an estimate of the temperature of the surface rather than a unitless digital value.

Following this, temperature estimates can be accurately assigned to a 3D model using thermal infrared-thermal infrared image data. In one example, this process considers a variety of factors that influence the reliability of temperature measurements, as well as utilizing a large number of images, in order to improve the estimation of temperature for surfaces in the 3D model. Furthermore, many of the advantages of the method apply equally to the visible modality so the technique is also used to improve the raycasting of colours on the model.

Given the estimate of the pose of the range sensor for all frames, which is an output of the aforementioned SLAM algorithm, estimates of the pose of the colour and thermal infrared camera for all their respective frames can be made. The accuracy of the estimates depend on the effectiveness of both the geometric and temporal calibration procedures.

For a single image, the estimated pose of the camera relative to the 3D model and the camera instrinsic parameters can be utilized to perform raycasting. This refers to the process through which pixels in the image are associated with vertices in the 3D model.

Given that the video sequences have many frames, most vertices will have many images and therefore many rays (pixels) associated with them. A naive approach would simply use a single pixel value to assign an estimate to each vertex. A more sophisticated approach may average the pixel values that are associated with each vertex, which is likely to reduce noise and achieve a slight improvement in accuracy. However, this assumes that each ray (the association between a pixel and a vertex) is equally valid.

For the preferred approach however, temperatures (and colours) are assigned based on a weighted sum of pixel values. The overall weighting for a ray $W_{ray}$ (corresponding to an image pixel) is based on a number of factors that reflect how reliable that ray is for estimating the value for the vertex.

In one example, the following factors can be considered for assigning a confidence level to a ray (for both thermal infrared or visible imaging modalities unless otherwise stated), including the velocity of the camera, the position of the pixel in the field of view, the angle between the ray and the surface normal of the vertex, the distance of the vertex from the camera, the validity of the sensor or sensor calibration over the operating range, as well as external factors, such as the external ambient temperature.

For example, for the velocity of the sensor is high, for example if the hand-held imaging device is moving faster (either in translation or rotation), motion blur in the resulting image would decrease the accuracy of the ray. Accordingly, for higher velocities, the pixel is given a lower confidence level. Regarding the position of the pixel, a lower confidence is given to rays associated with pixels located far from the camera centre, based on the assumption that points closer to the center have less distortion, and less noise. For the angle between the ray and the normal of the vertex, rays that are closer to parallel to the surface are likely to be less accurate due to the fact that slight errors in pose estimation have a larger effect at these angles, and hence these are given a lower confidence score. In considering the distance of the object surface from the sensor, a higher confidence is assigned to surfaces close to the camera, up to a certain distance. Sensor calibration is taken based on a calibration model, if required. Finally, for external factors, these could depend on readings from sensors. So for example, a lower confidence might be assigned to pixels that are close to an ambient temperature, as these may be harder to measure more accurately.

However, it will be appreciated that any suitable combination of factors could be used.

In any event, once an overall confidence score has been determined for each this allows the values for pixels across multiple images to be combined based on the confidence scores, thereby providing an overall value (either temperature or colour) that can be associated with part of the object surface, such as a vertex. In this manner, a temperature and/or colour profile can be established for the entire surface of the object, whilst allowing reflections or the like to be accounted for so that the three dimensional model of the object represents the true temperature or colour of the object.

In summary, advantages of some embodiments of the present invention include an ability to generate a holistic and geometrically accurate three-dimensional model of an object including thermal infrared and image data, without requiring complex and/or expensive hardware.

The present invention enables rapid three-dimensional visualization of thermal infrared information, which is particularly advantageous in the context of fire management and response, as well as within an electrical or structural building inspection.

The three-dimensional model provides an opportunity for a user to investigate and detect anomalies of an element or object, in a context of its surroundings. Such three-dimensional models can be utilized by inspectors for monitoring non-visible thermal infrared irregularities of buildings, or by medical practitioners to identify thermal infrared abnormalities in a patient.

According to certain embodiments, image and thermal infrared data can be viewed together, on a single model, which enables more accurate localisation of problems. For example, in an electrical maintenance context, the present invention enables a user to determine which of many electrical connections is heating up abnormally due to a faulty connection. The image data enables the user to view a text or colour-based label, whereas the thermal infrared data can be used to detect the heat caused by the fault.

Also, the present invention is able to operate in darkness, which is advantageous when explicit night-time analysis is called for by applications such as building energy auditing. Additionally, patients may prefer to be scanned in darkness rather than in a bright room.

Finally, the present invention does not require an external tracking device in order to accurately estimate a pose of the device, and can be implemented using simple, off-the-shelf components.

The above description focuses primarily on applications in the medical and energy auditing areas, however the present invention is useful in various other applications. These include application in the manufacturing sector, where thermal infrared profiles of moulds can be created to determine mould wear, cracks, and improper cooling, and the agriculture sector, where, for example, the quality of fruit, vegetables and grains can be determined. In particular, early detection of fungal infection in cereal grains can be performed as thermal infrared data can be integrated with optical image data to detect different fungal species caused by colour differences.

For example the system can be used in the medical field. This can include performing health inspections in working sites, monitoring effects such as vibration white fingers (circulatory/nerve damage due to use of certain tools and machinery), improving the decompression time and experience of divers, inspecting blood flow in the skin to test physiology and sympathetic nervous system responses, thermographic imaging to scan for fevers at airports and other transport hubs, as well as search and rescue situations. The system can be further used for diagnosing or validating treatment for inflammatory arthritis, Osteoarthritis, Tennis elbow, Peripheral circulation, melanoma, other cancers (breast), validation of criotherapy and diabetes.

Additionally, diagnosis of skin conditions and disorders, musculoskeletal diseases well as diseases that may leave a thermal signature, such as cancer. This can include thermography to detect breast cancer. Monitoring of these conditions requires obtaining multiple readings during periodic consultations, which requires fixed systems to take readings from the exact space locations every time. A portable 3D system may reduce this need. A portable technology may take diagnosis and medical services outside hospitals (remote locations).

In the agriculture field, the system can be used in quality evaluation of fruits and vegetables, measurement of maturity, size and number of fruits on trees, wheat class identification, quantification of non-uniform heating of cereal grains and oil seeds during cooking and microwave treatment, predicting water stress in crops and planning irrigation scheduling, bruise detection in fruits and vegetables, disease and pathogen detection in plants. There is also the potential for using thermal imaging system for early detection of fungal infection in cereal grains, integrating thermal imaging with optical imaging to take advantage of colour differences caused by different fungal species The system can be used in construction for diagnostics of building envelopes both after completing the building and during the operation period, determination of heat losses in facades, detection of defects of interpanel and expansion seams, monitoring of curing and/or drying of materials, or the like.

The system can be used by fire services, for example in field operations ranging from fire attack or detection, search/rescue, hot spot detection, overhaul activities, detecting the location of hazardous materials, including the detection of gases.

The system has industrial applications, such as monitoring electrical installations/equipment inspection (loose fuse connections, overload voltage in circuits), mechanical equipment inspection (overheated components, gas and liquid leakages), factory building diagnostics (moisture and water damages on floors and walls), process monitoring, such as curing, drying and thermal treatments, monitoring energy losses in industrial environments for cost saving purposes (missing insulations faulty HVAC systems), inspection of tank levels, lines, smoke pipes, gas flues and boilers for safety and operational efficiency purposes, detection of welding flaws in the polyethylene pipes (usage of polyethylene pipes which are being used more and more every day, including gas pipelines).

In manufacturing the system can be used for production of turboshaft engines for aircraft (use of 3D technology for creating images of components), creating thermal profiles of molds in industries such as plastics, glass, metals, and ceramics, to determine mold, identifying wear, cracks, and improper cooling, improving mold design or the like. This can include monitoring lines covered with very high levels of insulation, or shiny aluminium or stainless steel sheet metal coverings, which is currently difficult due to the high thermal reflectivity/low emissivity of the surfaces encountered, which can be obviated using the current system.

In domestic environments, the system can be used for monitoring energy losses for cost saving purposes (building and equipment inspection), identifying destructive pests (insects, rodents, termites).

The system can be used for security and surveillance, such as perimeter protection, access control, night vision monitoring systems, or the like, as well as providing enhanced vision systems for cars (image from pedestrians, cyclists, animals and other roadside objects).

It will also be appreciated that the system could be implemented with additional features, such as enhanced image/signal processing for better detail, video analytics for automated detection, threat assessment and response, high resolution for longer range performance and better image quality, higher-performance light sources and improved optics.

It will also be appreciated that the above described uses are not intended to be limiting and that the apparatus can be used in a wide range of activities and circumstances.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

Accordingly, this patent specification is intended to embrace all alternatives, modifications and variations of the present invention that have been discussed herein, and other embodiments that fall within the spirit and scope of the above described invention.

The claims defining the invention are:

1. A system for generating a three-dimensional model of an object, the system including:
   a portable hand-held imaging device including:
      a housing;
      a plurality of sensors attached to the housing;
   at least one electronic processing device coupled to the plurality of sensors, wherein the electronic processing device:
      determines from the plurality of sensors and whilst the imaging device is in at least two different poses relative to the object:
         range data indicative of a range of the object;
         thermal infrared data indicative of a thermal infrared image of the object;
      generates a three-dimensional model based at least partially upon the range data from the at least two different poses, wherein at least two thermal infrared images from different poses overlap so that the at least two images include an object surface part; and
      associates model data derived from the thermal infrared data from the at least two different poses with the three dimensional model to thereby provide a three dimensional thermal infrared model of the object by:
         selecting the object surface part;
         identifying the at least two thermal images from different poses including the selected object surface part;
         identifying at least one image pixel corresponding to the selected object surface part in each of the at least two thermal images; and,
         determining a confidence score associated with each image pixel; and
         determining the model data from a weighted sum of data associated with the identified image pixels, wherein the weighted sum is determined using the confidence scores for the identified image pixels.

2. The system of claim 1, wherein the electronic processing device:
   determines colour data indicative of a visible image of the object; and
   associates model data derived from the visible image data from the at least two different poses with the three dimensional model to thereby provide a three dimensional colour model of the object.

3. The system of claim 2, wherein the electronic processing device generates a three dimensional fused thermal infrared and colour model of the object.

4. The system of claim 2, wherein the system includes:
   a range sensor attached to the housing that senses a range of the object;
   a visible light image sensor attached to the housing that senses a visible image of the object; and
   a thermal infrared image sensor attached to the housing that senses a thermal infrared image of the object.

5. The system of claim 1, wherein the electronic processing device;
   determines a relative pose of the hand-held device; and,
   uses the relative pose to generate the three dimensional model.

6. The system of claim 5, wherein the electronic processing device determines the relative pose of the hand-held device using at least one of range data, image data and thermal infrared data from at least some of the different poses.

7. The system of claim 6, wherein the electronic processing device:
   estimates a timing skew between the range sensor and at least one of a thermal infrared image sensor and a visible light image sensor; and
   estimates a pose associated with the image data and/or the thermal infrared data based upon the skew.

8. The system of claim 7, wherein the electronic processing device:
   determines a device pose using at least one of the range sensor and a pose sensor;
   determines a path of movement of the hand-held device;
   determines a visible light image sensor pose and a thermal infrared image sensor pose based on the device pose and the path of movement.

9. The system of claim 5, wherein the system includes a pose sensor and wherein the electronic processing device determines the relative pose using pose data from the pose sensor.

10. The system of claim 9, wherein the pose sensor is at least one of an orientation sensor and an inertial measurement unit.

11. The system of claim 1, wherein for a thermal infrared image the model data includes model thermal infrared data indicative of a temperature and for a visible image the model data includes model colour data indicative of a colour.

12. The system of claim 1, wherein the electronic processing device associates the data with a voxel in the three dimensional model corresponding to the selected object surface part.

13. The system of claim 1, wherein the selected object surface part is a vertex.

14. The system of claim 1, wherein the electronic processing device determines the confidence score based on factors including at least one of:
   a velocity of a sensor when the image was captured;
   a position of the one or more pixels in a field of view of the sensor;
   an angle between a ray and an object surface, the ray extending from the object surface part to the sensor; and,
   the range when the image was captured.

15. The system of claim 14, wherein for a thermal infrared image, the electronic processing device determines the confidence score based on a temperature value associated with the identified pixels.

16. A method of generating a three-dimensional model of an object, the method including, in an electronic processing device:
   determining from the plurality of sensors and whilst an imaging device is in at least two different poses relative to the object:
      range data indicative of a range of the object;
      thermal infrared data indicative of a thermal infrared image of the object;
   generating a three-dimensional model based at least partially upon the range data from the at least two different poses, wherein at least two thermal infrared images from different poses overlap so that the at least two images include an object surface part; and
   associating model data derived from the thermal infrared data from the at least two different poses with the three dimensional model to thereby provide a three dimensional thermal infrared model of the object by:

selecting the object surface part;
identifying the at least two thermal images from different poses including the selected object surface part;
identifying at least one image pixel corresponding to the selected object surface part for each of the at least two thermal images; and,
determining a confidence score associated with each image pixel; and,
determining the model data from a weighted sum of data associated with the identified image pixels, wherein the weighted sum is determined using the confidence scores for the identified image pixels.

17. A system for generating a three-dimensional model of an object, the system including:
a portable imaging device including:
a housing;
a range sensor attached to the housing;
a visible light image sensor attached to the housing; and
a thermal infrared image sensor attached to the housing, wherein the range sensor, the visible light image sensor and the thermal infrared image sensor have overlapping fields of view;
at least one processor coupled to the range sensor, the visible light image sensor and the thermal infrared image sensor of the portable imaging device; and
a memory, coupled to the at least one processor, including instruction code executable by the processor for:
receiving range data from the range sensor, image data from the visible light image sensor, and thermal infrared data from the thermal infrared image sensor;
generating a three-dimensional model based upon the range data captured from several positions; and
associating data from the image data and the thermal infrared data, from at least two positions, with the three dimensional model by
selecting an object surface part;
identifying at least two thermal images from different positions including the selected object surface part;
identifying at least one image pixel corresponding to the selected object surface part for each of the at least two thermal images; and,
determining a confidence score associated with each image pixel; and,
determining a weighted sum of data associated with the identified image pixels, wherein the weighted sum is determined using the confidence scores for the identified image pixels.

18. The system of claim 17, wherein associating the image data and the thermal infrared data with the three-dimensional model comprises estimating a timing skew between the range sensor and at least one of the visible light image sensor and the thermal infrared image sensor, and estimating a pose associated with the image data and/or the thermal infrared data based upon the skew.

19. The system of claim 17, wherein the thermal infrared data is associated with the three-dimensional model based at least partly upon an angle of incidence.

20. The system of claim 17, wherein the portable imaging device further comprises an orientation sensor.

21. The system of claim 17, wherein the system further comprises at least one environmental sensor, wherein the thermal infrared data is associated with the three-dimensional model based at least partly upon data from the at least one environmental sensor.

22. The system of claim 21, wherein the at least one environmental sensor comprises a carbon dioxide sensor, a humidity sensor and/or a temperature sensor.

23. The system of claim 17, wherein the system further comprises an audio sensor for recording an operator's voice during operation of the system.

24. The system of claim 17, wherein the housing of the portable imaging device comprises an elongate portion, wherein the range sensor, visible light image sensor and thermal infrared image sensor are attached to an end of the elongate portion.

25. The system of claim 17, wherein the housing of the portable imaging device comprises a trigger for activating at least one of the range sensor, the visible light image sensor and the thermal infrared image sensor.

26. The system of claim 17, wherein the at least one processor is coupled to the range sensor, visible light image sensor and thermal infrared image sensor of the portable imaging device at least in part by a wireless data communication link.

27. The system of claim 17, wherein the thermal infrared image sensor comprises a thermal infrared sensor.

28. The system of claim 17, wherein the memory further includes instruction code executable by the processor for:
generating an output image corresponding to a view of the three-dimensional model, the output image including at least part of the associated image data superimposed on the model and at least part of the associated thermal infrared data superimposed on the model.

29. The system of claim 17, wherein the output image is generated by rendering at least part of the associated visible light image data on a first portion of the model and at least part of the associated thermal infrared data on a second portion of the model.

30. The system of claim 17, wherein the three-dimensional model corresponds to at least a part of a person's body and the associated image data includes skin tones of the person.

31. The system of claim 17, wherein the memory further includes instruction code executable by the processor for refining the three-dimension model based upon the image data and/or the thermal infrared data.

32. The system of claim 17, wherein the a portable imaging device further includes a display, for displaying data captured from one or more of the range sensor, visible light image sensor and thermal infrared image sensor, in real time as it is captured.

33. A method of generating a three-dimensional model of an object, the method including:
receiving, from a range sensor, a visible light image sensor and an thermal infrared image sensor, range data, image data and thermal infrared data, wherein the range sensor, the visible light image sensor and the thermal infrared image sensor have overlapping fields of view, and wherein the range data, image data and thermal infrared data each correspond to data from at least two different positions of the range sensor, visible light image sensor and thermal infrared image sensor;
generating a three-dimensional model based upon the range data; and
associating data from the image data and the thermal infrared data, corresponding to the at least two different positions, with the three dimensional model by
selecting an object surface part;
identifying at least two thermal images from different positions including the selected object surface part;

identifying at least one image pixel corresponding to the selected object surface part for each of the at least two thermal images; and, determining a confidence score associated with each image pixel; and, determining a weighted sum of data associated with the identified image pixels, wherein the weighted sum is determined using the confidence scores for the identified image pixels.

34. The method of claim 33, wherein the at least two different positions comprise arbitrary positions, wherein at least a part of an object visible in a first position of the at least two different positions is visible in a second position of the at least two positions.

35. The method of claim 34, wherein the arbitrary positions-comprise overlapping views caused by movement of the range sensor, the visible light image sensor and the thermal infrared image sensor across the object.

36. The method of claim 33, further comprising generating an output image corresponding to a view of the three dimensional model, the output image including at least part of the associated image data superimposed on the model and at least part of the associated thermal infrared data superimposed on the model.

* * * * *